United States Patent

[11] 3,602,586

| [72] | Inventors | Otmar Bartl<br>Munich;<br>Alfred Roppel, Munich; Johann Roth, Schwabhausen, all of, Germany |
|---|---|---|
| [21] | Appl. No. | 744,531 |
| [22] | Filed | July 12, 1968 |
| [45] | Patented | Aug. 31, 1971 |
| [73] | Assignee | Niezoldi & Kramer GmbH<br>Munich, Germany |
| [32] | Priority | July 13, 1967 |
| [33] | | Germany |
| [31] | | N 20324 |

[54] MOTION PICTURE CAMERA
8 Claims, 2 Drawing Figs.

[52] U.S. Cl. .................................... 352/243, 95/86, 352/95
[51] Int. Cl. .................................... G03b 17/00
[50] Field of Search .................................... 352/95, 243; 95/86

[56] References Cited
UNITED STATES PATENTS

| 2,126,338 | 8/1938 | Mihalyi | 352/141 |
| 3,043,205 | 7/1962 | Kaminski | 352/243 X |
| 3,187,341 | 6/1965 | Kubota | 352/243 X |
| 3,240,143 | 3/1966 | Koeber | 352/243 X |
| 3,301,627 | 1/1967 | Kimura | 352/243 X |
| 2,221,126 | 11/1940 | Barbee | 240/10.66 |
| 3,188,935 | 6/1965 | Lieser | 352/141 X |
| 3,240,143 | 3/1966 | Koeber | 352/243 X |
| 3,436,147 | 4/1969 | French | 352/141 |

FOREIGN PATENTS

| 1,380,325 | 10/1964 | France | 95/86 |

*Primary Examiner*—Samuel S. Matthews
*Assistant Examiner*—Monroe H. Hayes
*Attorney*—Michael S. Striker ABSTRACT: A motion picture camera wherein the housing is pivotally connected to a hollow pistol grip handle and accommodates one or more current-consuming units, such as an electric motor for the shutter and pulldown and an exposure meter. The handle accommodates a removable container with a set of batteries which are connected in circuit with the exposure meter and/or motor when the handle is pivoted to operative position in which terminals provided on the top wall of the container engage complementary terminals on the bottom wall of the housing.

MOTION PICTURE CAMERA

BACKGROUND OF THE INVENTION

The present invention relates to motion picture cameras in general, and more particularly to improvements in motion picture camera which comprise at least one current-consuming unit, for example, an electric motor which drives the shutter and the film transporting mechanism and/or an exposure meter comprising a moving-coil instrument or the like. Still more particularly, the invention relates to improvements in motion picture cameras of the type wherein the energy source or sources for one or more current-consuming units are accommodated in the handle.

It is already known to provide a motion picture camera with a pistol grip handle and to accommodate a set of discrete batteries in the interior of the handle. As a rule, the handle is movable in dovetailed guides provided therefor on the housing or body of the camera and the energy source or sources in the handle are connected in circuit with the current-consuming parts in the housing when the handle is properly attached to and positioned with reference to the housing. A drawback of such cameras is that the exchange of batteries takes up too much time and that an inexperienced operator is likely to insert the batteries improperly so that the camera is not ready for use when the handle is returned to operative position. Furthermore, the user must carry along a large number of discrete batteries.

SUMMARY OF THE INVENTION

It is an object of our invention to provide a motion picture camera which consumes electric current with means for facilitating rapid replacement of energy sources and to construct and assemble the camera in such a way that improper insertion of energy sources is either impossible or much less likely than in presently known cameras.

Another object of the invention is to provide a motion picture camera with a novel handle and with novel means for conducting current between energy sources in the handle and current-consuming units in the camera housing.

A further object of the invention is to provide a motion picture camera wherein several energy sources can be installed or removed in a single operation.

An additional object of the invention is to provide a motion picture camera wherein the current-consuming part or parts are automatically disconnected from the energy sources when the handle is moved from operative position.

The improved motion picture camera comprises a housing or body which accommodates at least one current-consuming unit, for example, an electric motor which drives a claw pull-down and/or a shutter, and an exposure meter, a hollow handle movable with reference to the housing between operative and inoperative positions, and means for supplying current to the unit or units in the housing, such current-supplying means comprising a container which is removably accommodated in the interior of the handle and one or more energy sources in the container. The container with the energy source or sources therein can be replaced by a similar container in a timesaving operation so that the replacement of spent energy sources with fresh energy sources consumes very little time. The container may also serve as a means for opening one or more circuits in the camera housing in response to movement of the handle to inoperative position. This insures that the camera cannot use up electrical energy when the handle is moved to inoperative position, even if one or more batteries or cells are accommodated in the housing proper.

If desired, the container can accommodate all of the energy sources which are needed for proper operation of the camera. This is of advantage in cold climates or in winter because the user can remove the container and store it in a pocket to maintain the energy sources at body temperature.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
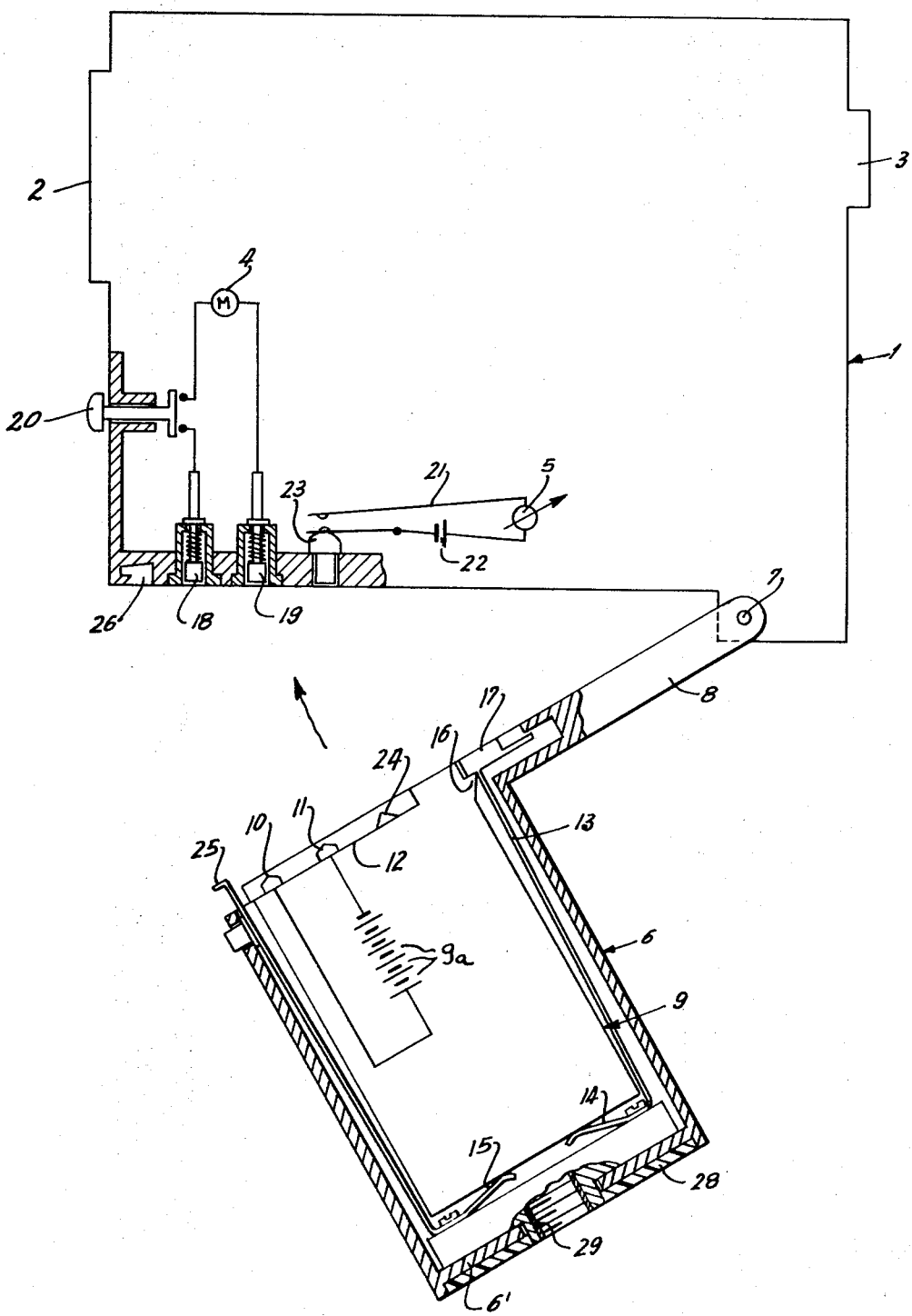
FIG. 1 is a schematic partly elevational and partly sectional view of a motion picture camera which embodies one form of our invention.

FIG. 1 illustrates a motion picture camera which comprises a housing or body 1 having a front wall which supports a lens mount 2 and a rear wall supporting the eyepiece 3 of the view finder. The housing accommodates several current-consuming units one of which includes an electric motor 4 which drives the film transporting mechanism and the shutter (not shown) and the other of which includes an exposure meter 5. The circuit of the motor 4 includes two spring-biased terminals 18, 19 which are accessible at the bottom wall of the housing 1 and a master switch 20 which has a pushbutton extending beyond the front wall of the housing. The circuit 21 of the exposure meter 5 includes its own energy source 22 e.g. a battery or a miniature cell) and an electric switch 23 having a movable contact which extends through the bottom wall of the housing 1.

The camera further comprises a hollow pistol grip handle 6 having an arm 8 which is pivotally secured to the bottom portion of the housing 1 by a pin 7 so that the handle can be moved between the inoperative position shown in FIG. 1 and an operative position in which its open upper side is adjacent to the bottom wall of the housing 1. The interior of the handle 6 accommodates a removable container 9 which contains six energy sources 9a connected in series and having their poles connected to two terminals 10, 11 provided on the top wall 12 of the container. When the handle 6 is moved to operative position, the terminals 10, 11 of the container 9 respectively engage the spring-biased terminals 18, 19 in the housing 1 so that the circuit of the motor 4 can be completed in response to depression of the pushbutton in the master switch 20. The top wall 12 of the container 9 further carries an actuating member or trip 24 which can lift the moving contact of the switch 23 to complete the circuit of the exposure meter 5 in response to movement of the handle to operative position. The container 9 and handle 6 are provided with a retaining device which releasably holds the container in the illustrated position. This retaining device operates by snap action and comprises two leaf springs 14, 15 mounted in the bottom zone of the compartment in the handle 6, a resilient arm 13 which is connected to or integral with the leaf spring 14, and a shoulder 16 provided on the container and engaging with a bent over tip of the arm 13 when the container deforms the leaf springs 14, 15. A release button 17 in the handle 6 can be depressed by the user in order to disengage the arm 13 from the shoulder 16 and to thus permit removal of the container. The leaf springs 14, 15 effect partial ejection of the container from the compartment of the handle 6 in response to depression of the release button 17.

A second retaining device which also operates by snap action is provided on the handle 6 and housing 1 to releasably hold the handle in operative position. This second retaining device comprises a resilient arm 25 which is integral with the leaf spring 15 and has a bent over tip which can enter a slot 26 and then engages an internal shoulder in the bottom wall of the housing 1 when the handle is moved to operative position. A release button 27 on the handle 6 can be depressed to disengage the tip of the arm 25 from the housing 1 and to thus permit pivotal movement of the handle to inoperative position.

When the handle 6 assumes the inoperative position, the circuit of the motor 4 is automatically deenergized because the terminals 10, 11 are disengaged from the complementary terminals 18, 19 in the housing 1. Also, the actuating member 24 is then moved away from the movable contact of the switch 23 and allows the latter to assume its normal open position.

The bottom wall 6' of the handle 6 is provided with an internally threaded socket 29 or analogous coupling means to facilitate connection of the camera to a tripod or an analogous support. The outer side of the bottom wall 6' has a liner 28 of plastic or other wear-resistant material.

Figure 2:
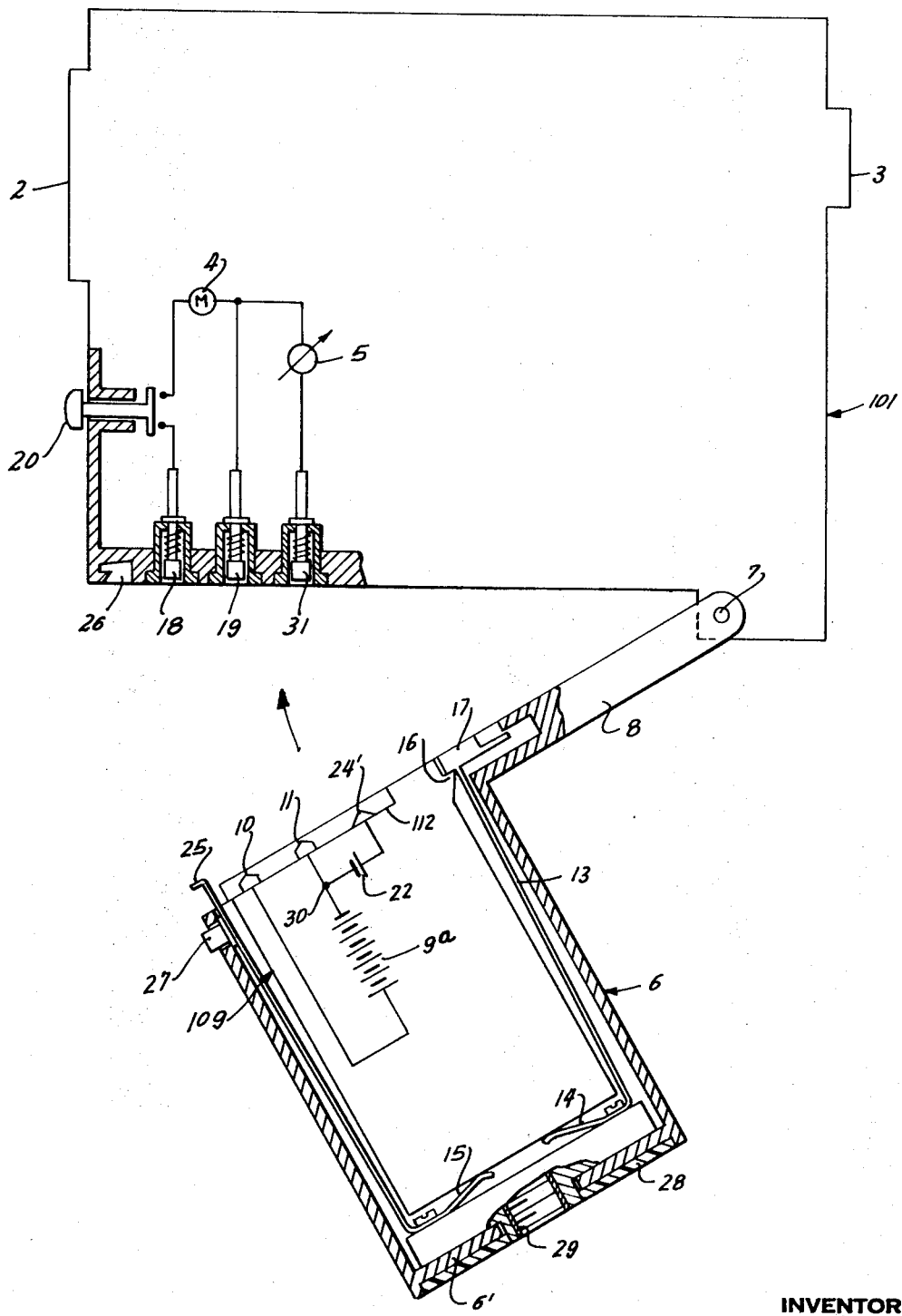
FIG. 2 is a similar view of a modified motion picture camera.

FIG. 2 illustrates a second camera which differs from the camera of FIG. 1 in that the energy source for the circuit of the exposure meter is accommodated in the container 109. Thus, the container 109 accommodates two types or sets of energy sources, namely, a first set including two or more batteries or miniature cells 9a which supply current to the motor 4, and a second set 22 which supplies current to the exposure meter 5. The bottom wall of the housing 101 has a third spring-biased terminal 31 which is engaged by a third terminal 24' on the top wall 112 of the container 109 when the handle 6 is moved to operative position. The terminal 11 is connected to one pole of the energy source 22 by a tap 30 which is grounded. The circuit of the exposure meter 5 is completed in response to closing of the master switch 20, i.e., simultaneously with completion of the circuit which includes the motor 4. Each of the terminals 18, 19, 31 preferably comprises a sleeve which is biased downwardly by a spring and accommodates a portion of the corresponding terminal 10, 11, 24' when the handle 6 is moved to operative position. The remaining numerals shown in FIG. 2 denote parts which are similar to or identical with the parts described in connection with FIG. 1.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

1. In a motion picture camera, a combination comprising a housing having a bottom wall; at least one current-consuming unit installed in said housing and having first electric terminal means located in the region of said bottom wall; a hollow handle having an internal compartment including an open upper end; mounting means permanently mounting said handle on said housing for pivotal movement between an operative position in which said upper end of said compartment is adjacent to the bottom wall of said housing and an inoperative position in which said handle is pivoted away from said operative position and said upper end of said compartment is readily accessible; and means for supplying electric current to said unit, including at least one source of electric energy and second electric terminal means connected with said source of electrical energy, said means for supplying electric current being removable from and reinsertable into said compartment by way of the upper end of said compartment in the inoperative position of said handle and said second terminal means being moved into current-conducting engagement with said first terminal means in response to movement of said handle from said inoperative to said operative position thereof and remaining in such current-conducting engagement while the handle dwells in said operative position.

2. A combination as defined in claim 1, wherein said means for supplying electric current to said unit further comprises a container having a top wall in the region of the open end of said compartment, said source of electrical energy being located in said container and said second terminal means being provided on the top wall of said container.

3. A combination as defined in claim 2, wherein said current-consuming unit comprises an electric circuit having switch means movable between open and closed positions, said container comprising actuating means for moving said switch means to one of said positions in response to movement of said handle to said operative position.

4. A combination as defined in claim 3, wherein said current-consuming unit is an exposure meter.

5. A combination as defined in claim 2, further comprising resilient retaining means for releasably holding said container in said handle.

6. A combination as defined in claim 1, further comprising resilient retaining means for releasably holding said handle in said operative position.

7. A combination as defined in claim 1 wherein said housing contains a plurality of current-consuming units and said means for supplying electric current comprises a plurality of energy sources, one for each of said units.

8. A combination as defined in claim 7, wherein one of said units comprises normally open switch means and said means for supplying electric current comprises means for closing said switch means in response to movement of said handle to said operative position.